United States Patent [19]

Muller et al.

[11] 4,448,498

[45] May 15, 1984

[54] OPERATION MICROSCOPE

[75] Inventors: Ortwin Muller; Klaus Biber, both of Aalen; Heinz Jakubowski; Gerhard Hanemann, both of Oberkochen, all of Fed. Rep. of Germany

[73] Assignee: Carl-Zeiss-Stiftung, Heidenheim/Brenz, d/b/a Carl Zeiss, Oberkochen, Fed. Rep. of Germany

[21] Appl. No.: 343,943

[22] Filed: Jan. 29, 1982

[30] Foreign Application Priority Data

Feb. 12, 1981 [DE] Fed. Rep. of Germany ....... 3105018

[51] Int. Cl.³ ...................... G02B 21/02; G02B 21/22; G02B 13/10
[52] U.S. Cl. .................................... 350/516; 350/522; 350/518; 350/502; 350/414; 350/447
[58] Field of Search ......................... 350/522, 513–516, 350/511, 518, 502, 507, 508, 539, 567, 6.4, 484, 414, 447

[56] References Cited

U.S. PATENT DOCUMENTS 3,417,685 12/1968 Kato et al. .......................... 350/522
4,155,622 5/1979 Klein .................................. 350/518
4,299,439 11/1981 Stromblad ........................... 350/522

Primary Examiner—Jon W. Henry
Attorney, Agent, or Firm—Hopgood, Calimafde, Kalil, Blaustein & Judlowe

[57] ABSTRACT

The invention contemplates an operation microscope in which three-dimensional viewing adjustment is possible with respect to an object (8) to be observed, all without forcing the surgeon or any co-observing person or instrumentality to move. To this end, the exit pupils and thus all viewing windows are positionally invariant, i.e., they are stationary and therefore can be securely related to a microscope support (5). An objective housing (7) in front of the microscope housing (1) is associated with all viewing systems (2, 3, 4), and this objective housing contains an objective of variable back focus as well as optical components (11, 12) for selective deflection of the observation ray path in each of two polar-coordinate directions. In making any one or all of the three-dimensional viewing adjustments, only elements of relatively low mass within the objective housing (7) need be moved.

7 Claims, 6 Drawing Figures

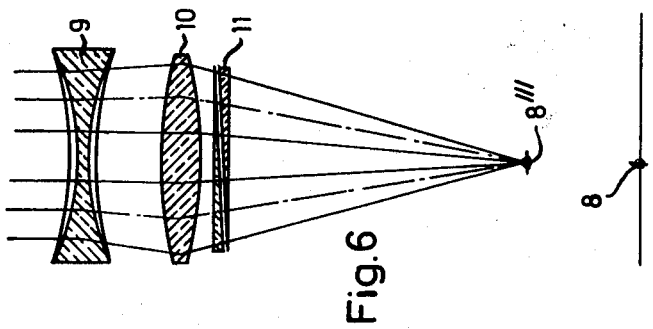
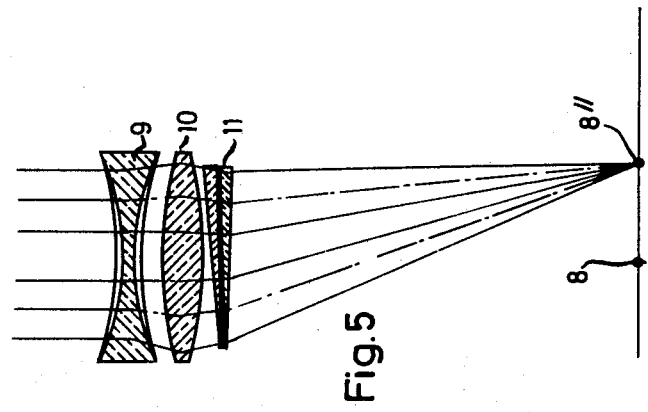
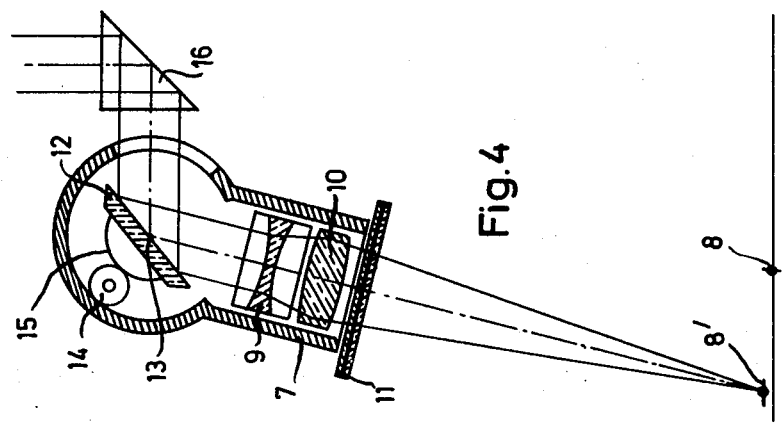

OPERATION MICROSCOPE

BACKGROUND OF THE INVENTION

The present invention relates to an operation microscope having an objective of variable focal length and a housing which is mounted to a support. The housing contains means on the observation-ray path for splitting and deflecting the beam, to serve at least two observation tubes.

Operation microscopes have acquired widespread use in all fields of microsurgery. This circumstance can be attributed to an increase in social awareness of the needs for human care and attention, and to advances in medicine, particularly the refinement of methods of operation. Refinement and complexity of methods of operation confront the surgeon with demands which, in many cases today, he can satisfy only by employing a second surgeon and using apparatus having greater technical possibilities and an increased number of functions. And at the same time, the extent and expense of education required for the training of surgeons have soared.

In recognition of these factors, particularly during the last two decades, operation microscopes have been very substantially expanded and encumbered by attachments and/or by modifications adapted to the requirements of individual disciplines.

The simplest embodiment of an operation microscope consists of an objective of long back focus and a binocular observation tube, combined in a housing. This housing is fastened to a floor- or a wall- or a ceiling mounted support. Such a microscope can be directed rapidly and simply to the object field to be observed, since no large masses need be moved, and suspension can be effected at least approximately at the center of gravity.

To meet a growing number of requirements, these simple universal operation microscopes have been substantially expanded in their function during the last few years, and as a result, size and weight of the apparatus have also increased greatly.

To illustrate such expansion of operation microscopes, mention may be made of magnification changers, illuminating devices and, in particular, co-observation, television and photographic devices. Such additional attachments are frequently greater in volume and weight than the operation microscope itself.

It is clear that all attachments make a thus-equipped operation microscope more difficult to use. Since the surgeon must have both his hands free, the required three-dimensional viewing adjustment of the operation microscope on the object is effected purely mechanically, via suitable movement of the suspension, i.e., of the support. In this case, large weights must be moved, resulting in considerable shifts in the center of gravity which must be reliably accommodated by the suspension. The supports are therefore made very stable, and are necessarily also very expensive.

Another disadvantage of the known operation microscopes is that, for each adjustment of focus and/or of the direction of observation effected by movement of the entire microscope, the surgeon and his co-observer are forced to move their heads and possibly even to move their entire upper bodies.

West German Patent application (Offenlegungsschrift) No. 2,439,820, discloses an operation microscope in which focusing no longer requires movement of the microscope itself. This microscope has an objective of variable back focus, comprising a fixed negative member and a positive member, which is axially displaceable for focusing purposes. However, this microscope does not avoid the disadvantage that the entire microscope must be swung in order to adjust the direction of observation, so that movements of the operator are still necessary.

West German Patent application (Offenlegungsschrift) No. 2,440,958 discloses an operation microscope which is so swingably mounted on its suspension that the swing axis of the microscope lies in the exit axis of partial beams directed to co-observer devices and/or to a photographic, motion-picture or television camera. Such attachments can thus be firmly connected with the microscope suspension or the support or be swingably connected to the microscope. They thus do not constitute an obstacle for the surgeon when the operation microscope is swung. The surgeon, however, is still forced to move his head and his upper body when the microscope is swung or displaced for fucusing.

BRIEF STATEMENT OF THE INVENTION

The object of the present invention is to provide an operation microscope in which three-dimensional viewing adjustment is possible with respect to an object to be observed, while microscope-exit pupils are positionally invariant for all observers and/or observation systems. Such a microscope can make it no longer necessary to move the viewing openings upon focusing and/or upon reorienting the direction of observation, i.e., the surgeon and his co-observer or co-observers need no longer be disturbed by being forced to move whenever there is a change in the setting of the microscope with respect to the operating field.

The invention achieves this object in an operation microscope by providing means for deflecting the observation-ray path in each of two coordinate directions, in association with an objective of variable back focus, within a housing at the front of the microscope housing.

In this way, substantial advantage is obtained in that adjustment of the direction of observation, and focusing adjustment may be effected by movement of the objective housing or by movement of elements contained therein; in either case, only minimum mass need be displaced and, therefore, a microscope support of relatively simple construction can be used.

It is advantageous to develop the operation microscope in such manner that the objective housing is rotatable with respect to the fixed microscope housing and contains a beam-deflection element which is so gear-coupled with the objective housing that, regardless of the angular orientation of the latter, the direction of the exit rays from the objective housing remains constant. A plane mirror or a prism may be used as said beam-deflection element. In order to adjust the lateral deflection of the observation-ray path, the objective housing advisedly also contains a pair of rotatable wedges.

The operation microscope of the invention is such as to enable simple implementation of all adjustments by remote control, namely, selective rotation of the objective housing, selective setting of the pair of rotatable wedges, and selective displacement of a back-focus element of the objective. In this way, each adjustment motion can be effected rapidly, simply and precisely, while the surgeon has both his hands free at all times.

DETAILED DESCRIPTION

The invention will be described in further detail in conjunction with the accompanying drawings, in which:

FIG. 3 is a section along the line III—III of FIG. 2, the sectional plane in which FIG. 2 is taken being designated II—II in FIG. 3;

FIG. 4 is a fragmentary view showing optical adjustment elements in a position to view a lateral region of an object; i.e., on an alignment laterally offset from the alignment depicted in FIG. 2;

FIG. 5 is a fragmentary view of optical elements of FIG. 4 in a position to view another lateral region of the object, the lateral offset being with respect to the alignment depicted in FIG. 3; and FIG. 6 is a view similar to FIG. 5 to show the optical elements in a position to view a more closely located object.

Figure 1:
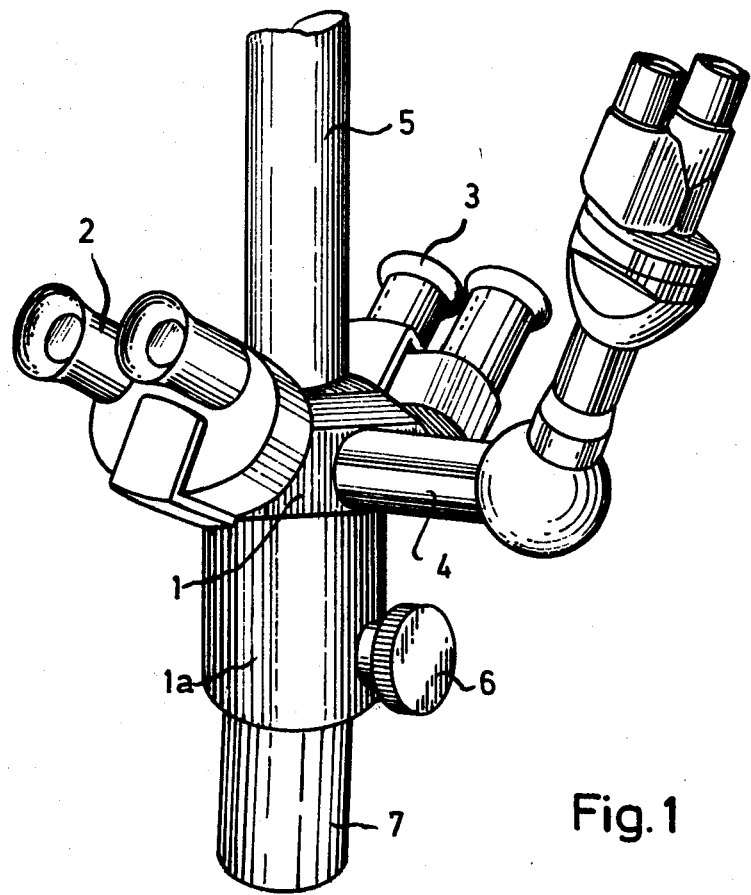
FIG. 1 is a perspective view of an illustrative embodiment of an operation microscope of the invention.

In FIG. 1, an operation microscope comprises a housing 1 to which two binocular tubes 2 and 3 are mounted. These tubes permit observation of an operating field by the surgeon and by a co-observer. On one side of housing 1 a co-observer tube 4 is available, as for the training of another surgeon. Housing 1 is securely connected to an arm 5 of a support. Housing 1 also has a cylindrical part 1a which may, for example, carry a knob 6 for actuating an enlargement changer, by which the degree of enlargement can be varied stepwise. It is also possible to provide, within housing part 1a, a pancratic system for the continuous change of enlargement. Such a system can be operated manually by means of knob 6; however, motor-driven displacement is also possible, in which case provision may be made for remote control.

An objective housing 7 is swingable with respect to housing 1, 1a and contains all elements serving for three-dimensionally setting the operation microscope to view a given object. Parts 1 to 6 are thus independent of microscope movement and are therefore securely mounted to the support arm 5.

In the operation microscope of the invention, all viewing ports 2, 3, 4 are always at the same place, i.e., even upon an adjusted lateral deflection of the direction of observation, their position does not change. The surgeon can therefore, prior to an operation, bring the viewing field into the position most favorable for him in the decimeter and centimeter ranges, by moving the entire apparatus via its support. Thereupon, the support is locked and all adjustment movements necessary during the surgical operation are effected by means of the objective housing 7 and the adjustment elements contained therein.

It will be understood that in an observation microscope in accordance with the invention, heavy co-observer devices can be located at definite optically suitable places, since it is no longer necessary to take into account a favorable position of the center of gravity.

Figure 2:
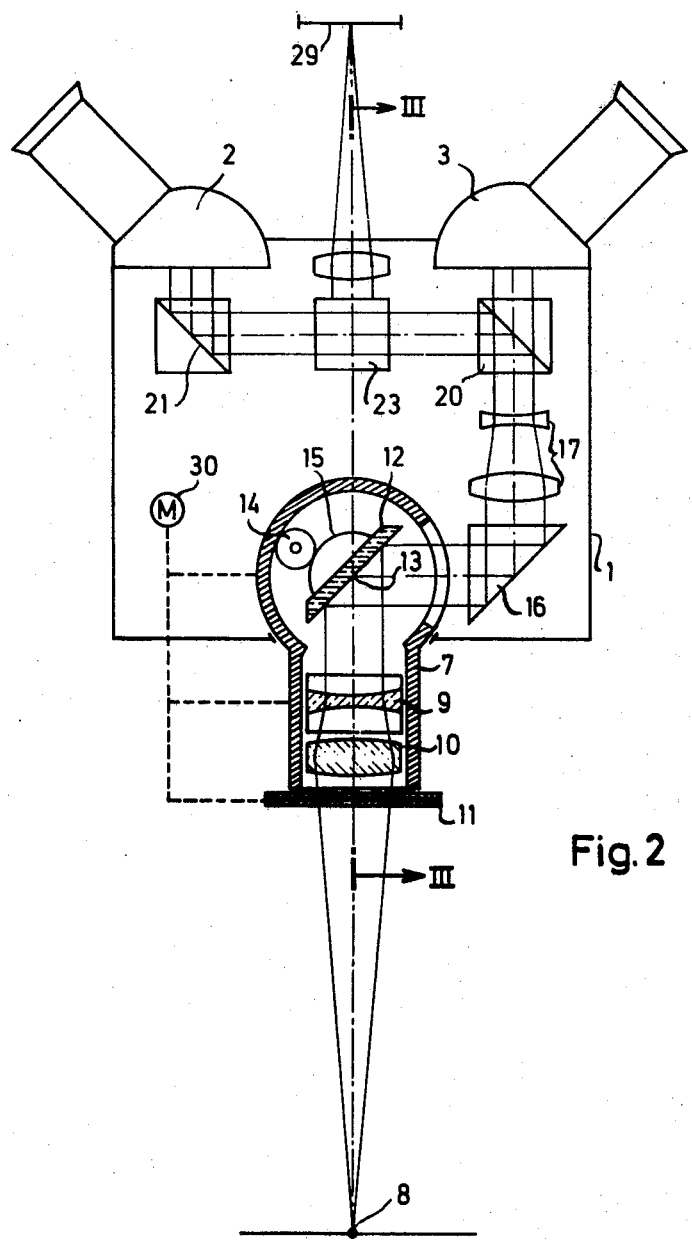
FIG. 2 is a diagrammatic view in longitudinal section through another embodiment.
Figure 3:
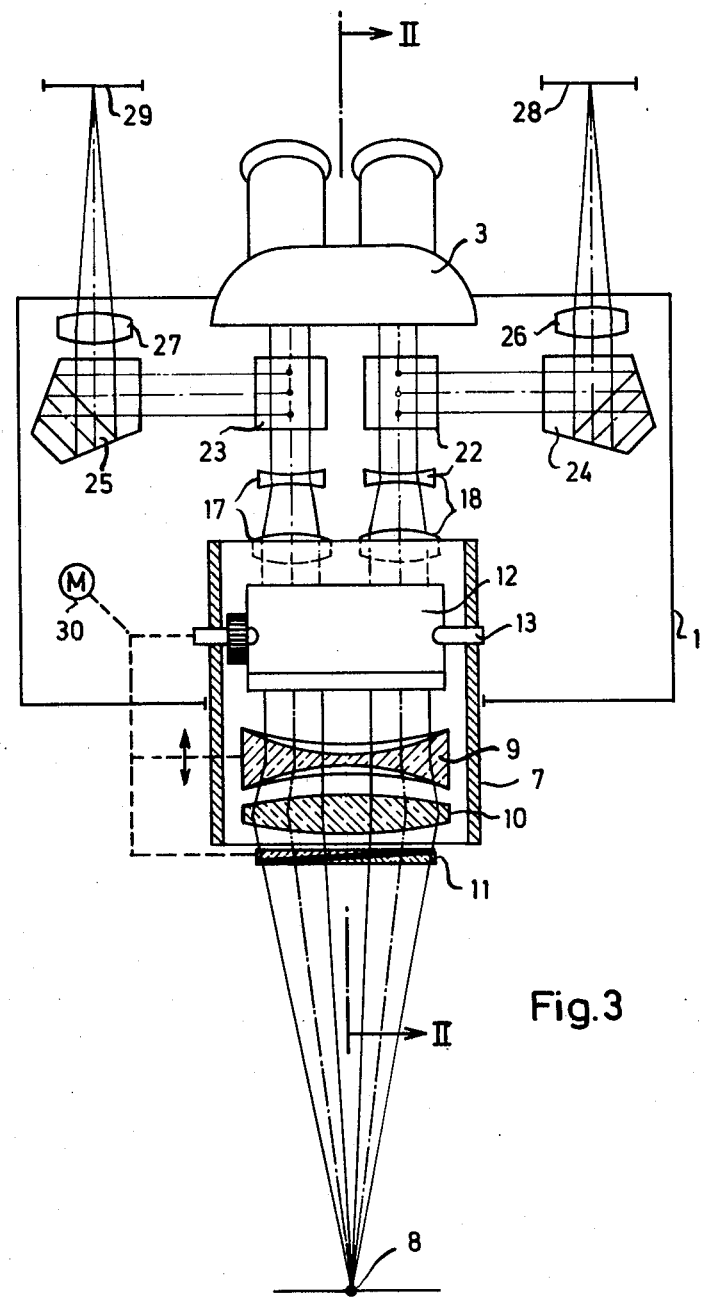

In the embodiment of FIGS. 2 and 3, light from an object 8 enters objective housing 7, which contains an objective acting as a telescope magnifier. This objective consists of two members 9 and 10, and a change in back focus is effected by axial displacement of the negative member 9. In addition, objective housing 7 contains a pair of rotatable wedges 11 and a deflection mirror 12. Housing 7 is rotatable about an axis 13, with respect to the microscope housing 1. In this connection, gear means 14, 15 assures that upon rotation of housing 7 about axis 13, there is a compensating rotation of mirror 12 about axis 13, to one-half the angular extent, so that the raypath direction emergent from housing 7 always remains constant.

Light emerging from the objective housing 7 is deflected by a prism 16 and passes through two systems 17, 18 which serve for selective change of enlargement. It is preferred that several such systems be turret-mounted for selectively indexed rotation via knob 6, so that the degree of enlargement can be changed stepwise.

Light passes from systems 17, 18 to two splitting cubes 20, only one of which is visible in FIG. 2. The transmitted fraction of light passes through and enters binocular tube 3. The reflected fraction of light, i.e., reflected by cubes 20 passes, via two deflection mirrors 21, to binocular tube 2.

Two further splitting cubes 22, 23 are disposed between the splitting cubes 20 and the deflection mirrors 21; cubes 22, 23 focus the split radiation, via deflection prisms 24, 25 and lens systems 26, 27, at two image planes 28, 29 located to the side of the housing 1. Documentation systems, such as photographic, motion picture or television cameras, can be positioned to utilize focus at the image planes 28, 29.

Within housing 1, a motor 30 controlled by suitable switching means (not shown) will be understood to provide rotational drive to the objective housing, axial-displacement drive to negative member 9 of objective 9, 10, and/or rotary drive to set the pair of rotatable wedges 11.

In the positioning shown in FIG. 4, the objective housing 7 has been swung to the extent that light coming from a lateral region 8' of object 8 enters housing 7. In this circumstance, gear means 14, 15 will have so displaced mirror 12 that the direction of light emerging from mirror 12 remains constant, i.e., light passes to deflection prism 16 in the same manner as in the case of FIG. 2.

FIG. 5 illustrates another adjusted positioning in which the result is obtained, for a suitable setting of the pair of rotatable wedges 11, that another lateral region 8" of object 8 is observed. By selectively angularly positioning said wedges 11 with respect to each other, the magnitude and direction or two-dimensional lateral offset of the observation-ray path external to the objective 9, 10 may be selectively controlled with respect to the optical axis of said objective. Thus, by rotating wedges 11 in their mutual position shown in FIG. 5 about the optical axis of objective 9, 10 the observed lateral position 8" moves on a circle around position 8.

In FIG. 6, the negative member 9 has been so axially displaced with respect to the fixed positive member 10 as to enable sharp observation of an object region 8'" which is closer to the microscope than object 8.

The adjustments of FIGS. 5 and 6 are effected by suitably connected actuation of the motor 30. In all cases, only very small masses are moved, while the heavy microscope housing 1 with all its viewing windows and documentation systems remains invariant, and independent of viewing and focus movements.

What is claimed is:

1. An operation microscope having an observation-ray path and comprising a microscope housing and means for rigidly mounting the same to fixed supporting structure, at least one observation tube fixed to said housing, an objective housing swingably connected to said microscope housing, an objective carried within said objective housing, means for selectively varying the back focus of said objective, means including a pair of wedges rotatably carried by said objective housing on said ray path and in front of said objective, and means for selectively angularly positioning said wedges with respect to each other whereby the magnitude and direction of lateral offset of the observation-ray path external to said objective may be selectively controlled, with respect to the optical axis of said objective.

2. The operation microscope of claim 1, in which said objective housing contains a movable beam-deflection element which is so coupled to the objective housing that the direction of the observation-ray path emerging from the objective housing remains constant regardless of the angular position of the objective housing with respect to the microscope housing.

3. The operation microscope of claim 2, in which the coupling between the beam-deflection element and the objective housing is via gear means.

4. The operation microscope of claim 1, in which remote-control means including a motor is operatively connected for selectively driving (a) the swing of said objective housing, (b) said back-focus varying means, and (c) the means for angularly positioning said wedges.

5. The operation microscope of claim 2, in which said observation tube is one of at least two served by the observation-ray path emerging from the objective housing.

6. An operation microscope comprising a microscope housing and means for rigidly mounting the same to fixed supporting structure, at least one binocular observation tube fixed to said housing, an objective housing and an objective of variable back focus carried within said objective housing, a beam-deflection element connected within said objective housing and behind said objective for swing about a swing axis normal to the optical axis of the objective, said objective housing being connected to said microscope housing for selective swing about said swing axis, a binocular observation-ray path on spaced optical paths within the microscope housing and serving the respective oculars of the observation tube, the optical paths being incident upon said beam-deflection element in spaced parallel relation (a) in directions normal to said swing axis and (b) at locations of deflection-element incidence, which locations are symmetrically offset from the optical axis of said objective, and swing responsive means coupling said beam-deflection element and said objective housing to said microscope housing for correlated swing about said swing axis such that the binocular observation-ray path emergent from said objective housing remains fixed, for a range of swing of said objective housing.

7. The operation microscope of claim 6, in which a pair of optical wedges is rotatably carried by said objective housing in front of said objective, and means for selectively angularly positioning said wedges with respect to each other, whereby the magnitude and direction of lateral offset of the observation-ray path external to said objective may be selectively controlled with respect to the optical axis of said objective.

* * * * *